(12) United States Patent
Baleine et al.

(10) Patent No.: US 9,910,260 B2
(45) Date of Patent: Mar. 6, 2018

(54) METHOD AND APPARATUS FOR TURBINE INTERNAL VISUAL INSPECTION WITH FOVEATED IMAGE OPTICAL HEAD

(71) Applicant: Siemens Energy, Inc., Orlando, FL (US)

(72) Inventors: Erwan Baleine, Orlando, FL (US); David J. Meek, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 204 days.

(21) Appl. No.: 14/601,266

(22) Filed: Jan. 21, 2015

(65) Prior Publication Data

US 2016/0209636 A1    Jul. 21, 2016

(51) Int. Cl.
| | | |
|---|---|---|
| H04N 7/18 | (2006.01) | |
| G02B 23/24 | (2006.01) | |
| H04N 5/232 | (2006.01) | |
| H04N 5/225 | (2006.01) | |
| G02B 3/14 | (2006.01) | |
| G02B 13/18 | (2006.01) | |
| H04N 5/357 | (2011.01) | |

(52) U.S. Cl.
CPC .......... *G02B 23/2446* (2013.01); *G02B 3/14* (2013.01); *G02B 13/18* (2013.01); *H04N 5/2254* (2013.01); *H04N 5/23212* (2013.01); *H04N 5/23293* (2013.01); *H04N 5/3572* (2013.01); *H04N 2005/2255* (2013.01)

(58) Field of Classification Search
CPC ............. H04N 5/3572; H04N 5/23212; H04N 5/23293; H04N 5/2254; H04N 2005/2255; G02B 23/2446; G02B 13/18; G02B 3/14; G01M 15/14
See application file for complete search history.

(56) References Cited

U.S. PATENT DOCUMENTS

| | | |
|---|---|---|
| 3,572,886 A | 3/1971 | Curtiss |
| 4,354,742 A | 10/1982 | Abel et al. |
| 5,161,051 A | 11/1992 | Whitney et al. |
| 5,374,272 A | 12/1994 | Arpa et al. |
| 6,219,186 B1 | 4/2001 | Hebert |
| 6,239,918 B1 | 5/2001 | Young et al. |
| 6,473,241 B1 | 10/2002 | Wick et al. |

(Continued)

*Primary Examiner* — Sath V Perungavoor
*Assistant Examiner* — Peet Dhillon

(57) ABSTRACT

Combustion or steam turbine engines internal areas of interest are inspected by insertion of a foveated image optical head through internal passages within the engine. The foveated image optical head has a central first image portion having higher magnification and smaller field of view that is included within and subtended by a second image portion having a wider field of view and lower magnification. The foveated image optical head facilitates maneuvering the borescope optical head through the turbine engine with the wider field of view second image portion to areas of interest, then performing a more detailed inspection by viewing the higher magnification first image portion. The optical head lenses are in fixed positions, sharing a single, common optical path and a common electronic image sensor. This lens and detector arrangement facilitates construction of a compact optical head, allowing passage through small diameter engine inspection ports.

20 Claims, 5 Drawing Sheets

(56) References Cited

U.S. PATENT DOCUMENTS

| | | |
|---|---|---|
| 7,553,020 B2 | 6/2009 | Goldfain et al. |
| 7,630,148 B1 | 12/2009 | Yang et al. |
| 7,889,434 B2 | 2/2011 | Pauker et al. |
| 8,130,454 B2 | 3/2012 | Noguchi |
| 8,212,915 B1 | 7/2012 | Clark et al. |
| 8,294,808 B2 | 10/2012 | Caron |
| 8,360,963 B2 | 1/2013 | Hendriks et al. |
| 2002/0139920 A1 | 10/2002 | Seibel et al. |
| 2007/0156021 A1* | 7/2007 | Morse .................. A61B 1/0019 600/167 |
| 2011/0169931 A1 | 7/2011 | Pascal et al. |
| 2012/0130162 A1 | 5/2012 | Dolt et al. |
| 2012/0143004 A1 | 6/2012 | Gupta et al. |
| 2013/0194379 A1* | 8/2013 | Baleine .............. G02B 23/2492 348/36 |
| 2013/0267784 A1 | 10/2013 | Andreassen et al. |
| 2015/0238071 A1* | 8/2015 | Hua ........................ A61B 1/07 600/109 |

\* cited by examiner

METHOD AND APPARATUS FOR TURBINE INTERNAL VISUAL INSPECTION WITH FOVEATED IMAGE OPTICAL HEAD

CROSS-REFERENCE TO RELATED APPLICATIONS

This application incorporates by reference in its entirety United States utility patent application entitled "METHOD AND APPARATUS FOR TURBINE INTERNAL VISUAL INSPECTION WITH FOVEATED OPTICAL HEAD AND DUAL IMAGE DISPLAY", filed concurrently herewith and assigned Ser. No. 14/601,270.

BACKGROUND OF THE INVENTION

1. Field of the Invention

The invention relates to internal visual inspection of turbine engines, such as combustion/gas turbine engines or steam turbine engines by insertion of optical cameras through internal passages within the engine via a delivery mechanism, such as an elongated articulated arm or flexible conduit. More particularly the invention relates to borescopes having foveated image optical heads, with a central first image portion having higher magnification and smaller field of view that is included within and subtended by a second image portion having a wider field of view and lower magnification. The foveated image optical head facilitates maneuvering the borescope optical head through the turbine engine with the wider field of view second image portion to areas of interest, then performing a more detailed inspection by viewing the higher magnification first image portion.

2. Description of the Prior Art

Steam or combustion turbine engines in electric power generation plants require periodic scheduled inspection and maintenance. Gas or combustion turbine engines are more frequently subject to intermittent operation to meet fluctuating power demands; hence for both economic and operational efficiency it is desirable to perform periodic visual internal inspections of the assembled engines between power demand cycles.

A common way to perform visual inspection of blades and vanes in compressor and turbine sections of the engines is by insertion of a rigid, articulate arm or flexible conduit borescope through inspection ports that are constructed about the engine periphery. Many of those inspection ports have inner diameters of less than 13 mm. Inside the engine internal passageways from the inspection ports into many areas of interest have tight confines that physically limit maneuvering space for borescope optical heads. As a practical matter optical heads having axial length greater than 40 mm cannot be maneuvered through confines of some turbine internal passageways.

Optical head dimensional envelope constraints also constrain optical performance capabilities. Image field of view (FOV) and magnification are interrelated. Generally, for a given lens or lens train design increasing FOV decreases magnification. It is desirable to maneuver a borescope optical head within the inspected engine with a relatively wide field of view lens train, but the resultant magnification may not be sufficient to perform a satisfactory visual inspection once the optical head is positioned to an area of interest, for example inspecting for cracks or spallation of a turbine blade airfoil external surface thermal barrier coat. One previously known inspection magnification solution was to remove the lower magnification borescope and replace it with a higher magnification, smaller FOV borescope where needed for more detailed inspection. Another previously known solution for turbine engine internal inspection has been use of a variable FOV/magnification borescopes, but many have optical heads that are too large to fit within the small dimensional confines of desired inspection ports. For example, borescopes have been constructed with separate, dedicated completely separate parallel optical paths or beam splitting downstream of the primary objective lens for different FOV/magnification requirements: essentially two separate optical instruments in a shared optical head. Generally the parallel optical path optical heads have either larger diameter or axial length than allowable for insertion into many turbine engine inspection ports. Other borescopes have zoom magnification capability by physically varying axial spacing between lenses in the lens train and/or the image detector at the design cost of optical head added axial length. Yet other borescopes rely electronic image processing to substitute for physical lens FOV/magnification adjustment. The electronic image processing can include: (i) separate dedicated sections of a common electronic detector for each FOV/magnification setting or (ii) post image gathering enlarged pixel display. Either of those electronic imaging processing techniques decreases image detail. In the case of (i) less than the entire available image sensor pixel density is used to provide image detail. In the case of (ii) the enlarge pixels do not contain any additional image detail compared to a true magnified image view. There has also been concern that inclusion of electronic devices, such as lens autofocus mechanisms or adjustable lens shaping mechanisms, in optical heads that are exposed to heated ambient temperatures within cooling engines might lead to failure of those electronic mechanisms.

SUMMARY OF THE INVENTION

Exemplary embodiments described in greater detail herein incorporate foveated image optical heads that are inserted to combustion or steam turbine engines internal areas of interest. The foveated image optical head has a central first image portion having higher magnification and smaller field of view that is included within and subtended by a second image portion having a wider field of view and lower magnification. In some exemplary embodiments the foveated image is generated with a monolithic aspheric objective lens. In other exemplary embodiments a first liquid lens is aligned along the same optical path as the objective lens for selectively transmitting the foveated image first or second portions. In other exemplary embodiments a second focusing liquid lens is aligned along the same common optical path as objective lens and the first liquid lens for selectively enhancing image focus. The foveated image optical head facilitates maneuvering the borescope optical head through the turbine engine with the wider field of view second image portion to areas of interest, then performing a more detailed inspection by viewing the higher magnification first image portion. The optical head lenses are in fixed positions, sharing a single, common optical path and a common electronic image sensor. This lens and detector arrangement facilitates construction of a compact optical head, which in some embodiments has an outer diameter of less than 11 mm and an axial length less than 40 mm, allowing passage through small diameter engine inspection ports.

Other exemplary embodiments described herein provide for simultaneous separate common display of the first higher magnification and the second wider FOV foveated image portions by switching the first liquid lens sequentially between two focusing states and displaying the image feeds in parallel on separate dedicated portions of a common shared imaging screen, which may include a wearable imaging screen device, such as eyeglasses. Alternatively the same simultaneous separate common display of the first higher magnification and the second wider angle image portions common can be performed with non-foveated images.

Exemplary embodiments of the invention feature a method for internal visual inspection of a turbine engine by providing an inspection system including a borescope capable of generating a foveated image on a single optical path, with a first central image portion having a first angular field of view and magnification that is included within and subtended by a second image portion having a second wider angle field of view and lower magnification. The borescope is inserted from turbine engine exterior through its internal passages to an internal area of interest. A foveated image of the internal area of interest within the engine is then captured with the inspection system. The captured foveated image is then selectively displayed on a visual display. Alternatively or additionally the captured image is stored.

Other exemplary embodiments of the invention feature a method for internal visual inspection of an assembled turbine engine from its exterior. An inspection system is provided which includes a borescope having an elongated delivery mechanism, having a distal end for insertion from the turbine exterior through its internal passages to areas of interest, and an optical head coupled to the delivery mechanism distal end. The optical head includes: an objective lens capable of transmitting a foveated image with a first central image portion having a first angular field of view and magnification that is that is included within and subtended by a second outer concentric image portion having a second wider angle field of view and lower magnification; a first liquid lens, for selectively transmitting the foveated image first or second portions that were received from the objective lens; and a second liquid lens for selectively enhancing image focus of images received from the first liquid lens. Each of the respective lenses is coupled in fixed axial positions along a shared single optical path within the optical head. The optical head also has an electronic image sensor optically coupled to the second liquid lens, for common capture and transmission of all images received from the second liquid lens. A liquid lens control system is coupled to the first liquid lens for selectively causing the first liquid lens to transmit images received from the objective lens, and coupled to the second liquid lens for selectively or automatically causing the second liquid lens to enhance focus of images transmitted by the first liquid lens. An imaging system is coupled to the common electronic image sensor for selectively generating the foveated image first or second portions, viewable outside an exterior of the inspected turbine engine. The inspection is performed by inserting the inspection optical head from an exterior of a turbine engine to an internal area of interest within by routing the delivery mechanism through engine internal passages. Images of the internal area of interest within the engine are captured with the imaging system. The captured images are selectively displayed outside the turbine engine exterior by selectively causing the first liquid lens to transmit the selected image portion with the liquid lens control system to the electronic image sensor and imaging system.

Additional exemplary embodiments of the invention feature a turbine engine internal visual inspection system including a borescope having an elongated delivery mechanism having a distal end for insertion from a turbine engine exterior through its internal passages to areas of interest. An optical head is coupled to the delivery mechanism distal end. The optical head has an objective lens capable of transmitting a foveated image with a first central image portion having a first angular field of view and magnification that is included within and subtended by a second outer concentric image portion having a second wider angle field of view and lower magnification; a first liquid lens, for selectively transmitting the first or second image portions that were received from the objective lens; and a second liquid lens for selectively enhancing focus of image portions received from the first liquid lens. The respective lenses are coupled in fixed axial positions along a shared, single, common optical path within the optical head. An electronic image sensor is optically coupled to the second liquid lens, for common capture and transmission of all image portions received from the second liquid lens. A liquid lens control system is coupled to the first liquid lens for selectively causing the first liquid lens to transmit first or second image portions received from the objective lens, and coupled to the second liquid lens for selectively or automatically causing the second liquid lens to enhance focus of image portions transmitted by the first liquid lens. An imaging system is coupled to the common electronic image sensor for selectively generating the first or second image portions, which are viewable on a display outside the exterior of the inspected turbine engine.

The respective features of the exemplary embodiments of the invention may be applied jointly or severally in any combination or sub-combination.

BRIEF DESCRIPTION OF THE DRAWINGS

Exemplary embodiments of the invention can be understood by considering the following detailed description in conjunction with the accompanying drawings, in which.

To facilitate understanding, identical reference numerals have been used, where possible, to designate identical elements that are common to the figures.

DETAILED DESCRIPTION

Exemplary embodiments of the invention can be utilized for inspection of combustion or steam turbine engines internal areas of interest by insertion of a foveated image optical head through internal passages within the engine. The foveated image optical head has a central first image portion having higher magnification and smaller field of view that is included within and subtended by a second image portion having a wider field of view and lower magnification. The foveated image optical head facilitates maneuvering the borescope optical head through the turbine engine with the wider field of view second image portion to areas of interest, then performing a more detailed inspection by viewing the higher magnification first image portion. The optical head lenses are in fixed positions, sharing a single, common optical path and a common electronic image sensor. This lens and detector arrangement facilitates construction of a compact optical head, allowing passage through small diameter engine inspection ports.

Figure 1:
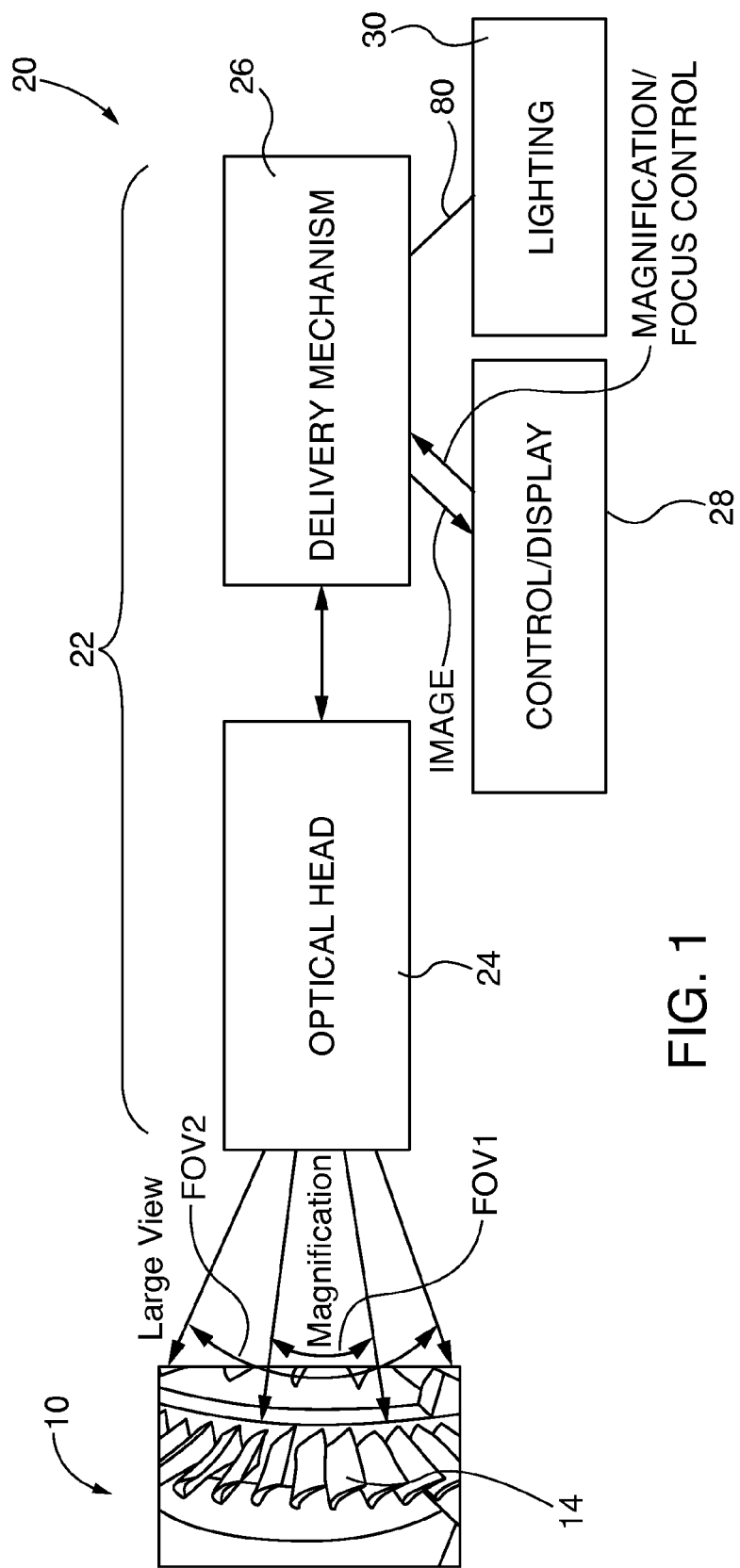
FIG. 1 is a block diagram of an exemplary embodiment of a turbine engine internal visual inspection system.
Figure 2:
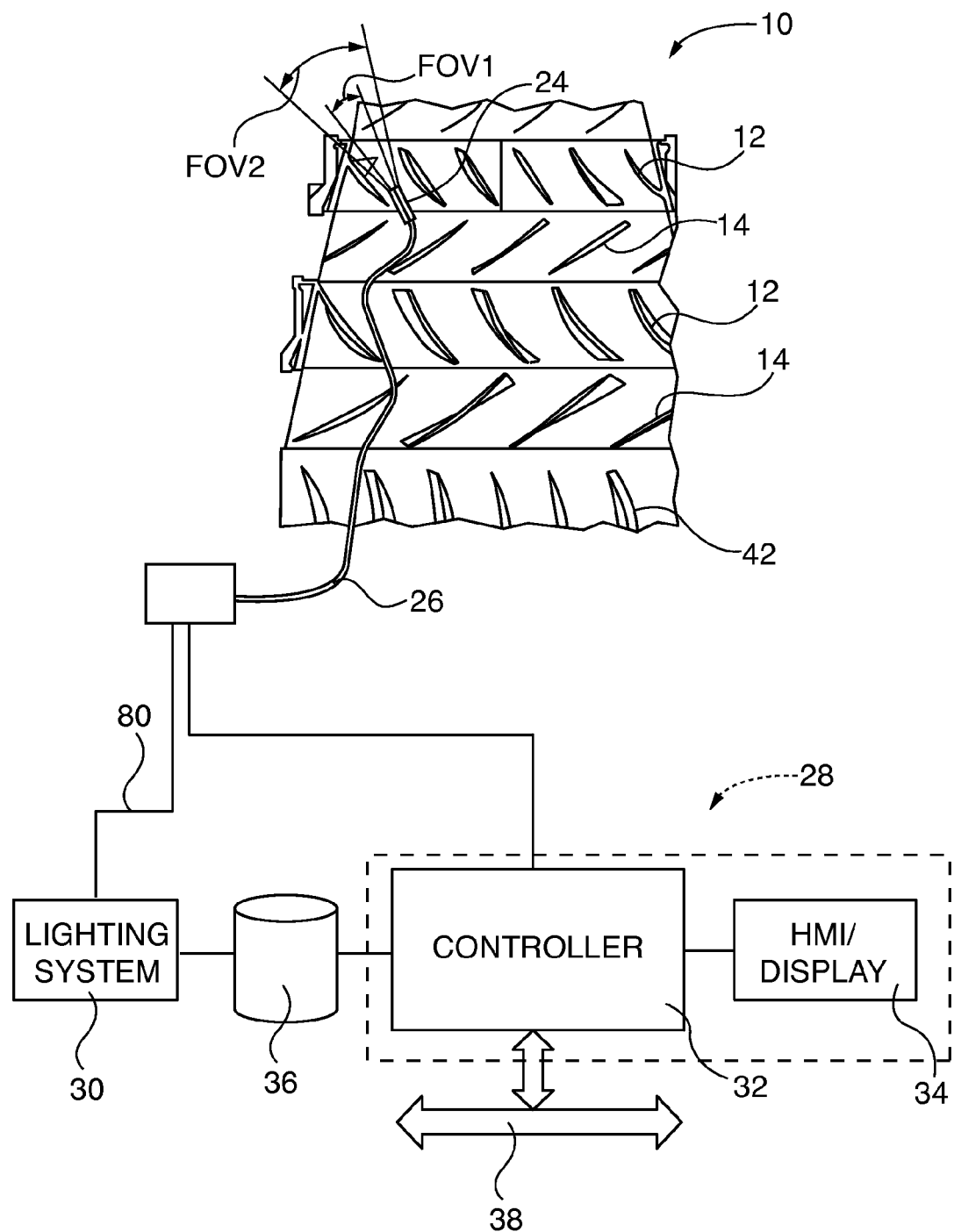
FIG. 2 is a fragmented plan view of an exemplary embodiment of a turbine engine internal visual inspection system being used to perform an internal inspection of a combustion turbine.

FIGS. 1 and 2 show block diagrams of the functional components of an exemplary embodiment of a combustion turbine internal inspection system being used to perform inspection of a gas or combustion turbine engine 10 vane rows 12 and blade rows 14. The inspection system 20 is also utilized for internal inspection of other power plant apparatus, such as steam turbines, heat exchangers, turbo generators or other industrial apparatus. The remainder of this description focuses on application of the inspection system 20 embodiments of the present invention to internal inspection of combustion or gas turbine engines 10; including engines that are still in cool down phase at temperatures greater than 60° C. A gas turbine engine 10 rotating blade row 14 area of is being visually inspected internally within the assembled engine by a borescope 22, which includes an optical head 24 that is capable of generating and capturing a foveated image. The foveated image comprises a first central image portion having a first angular field of view (FOV1) and magnification that is included within and subtended by a second image portion having a second wider angle field of view (FOV2) and lower magnification. A delivery mechanism 26, such as a flexible conduit, flexible sheath motorized or non-motorized articulated arm or the like is used to insert, thread or otherwise snake the optical head 24 through internal passages of the turbine engine 10, including for example through inspection ports. A control system with coupled visual display 28 is communicatively coupled to the optical head 24. The control system 28 controls and operates mechanisms within the optical head 24 and gathers images for processing and display. A lighting system 30 provides an illumination source for the optical head 24 to aid in internal visual inspection of the turbine engine.

Referring more specifically to FIG. 2, the control system 28 includes a controller 32 and coupled human machine interface (HMI)/display 34, exemplary embodiments of all of which can be incorporated within a commercial off-the-shelf tablet computer hardware platform. The controller 32 tablet computer embodiment incorporates a computer processor that accesses and executes non-volatile instruction sets stored in the device's own or external memory. While there is reference to an exemplary control system 28 controller platform architecture and implementation by software modules executed by the processor, it is also to be understood that exemplary embodiments of the invention may be implemented in various forms of hardware, software, firmware, special purpose processors, or a combination thereof. Preferably, aspects of the invention embodiments are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. In addition, various other peripheral devices may be connected to the computer/controller platform. For example, data and/or image storage and/or auxiliary memory 36 are communicatively coupled to the controller 32 directly or by data bus 38, such as an Internet data bus. In alternative embodiments, the HMI/display 34 comprises a wearable display, such as a wrist-mounted display or eyeglass-type display, for ease of inspector mobility. Wearable display and/or HMI control devices facilitate hands-free inspection so that the inspector is not required to hold a display computer tablet device or be anchored to a fixed position monitoring station.

Figure 3:
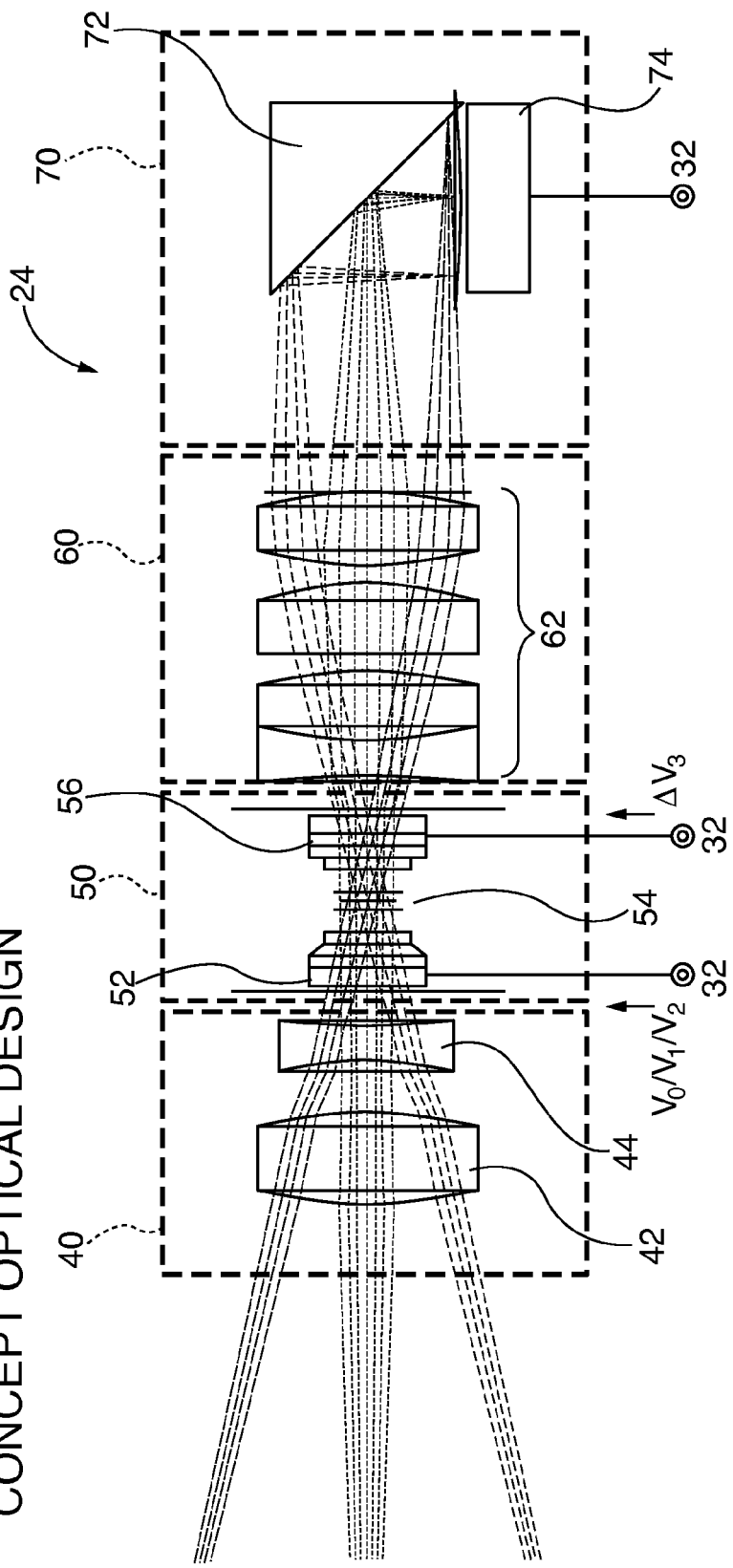
FIG. 3 is a schematic axial elevational view of an exemplary embodiment of an optical lens train and image sensor for a visual inspection system optical head.
Figure 4:
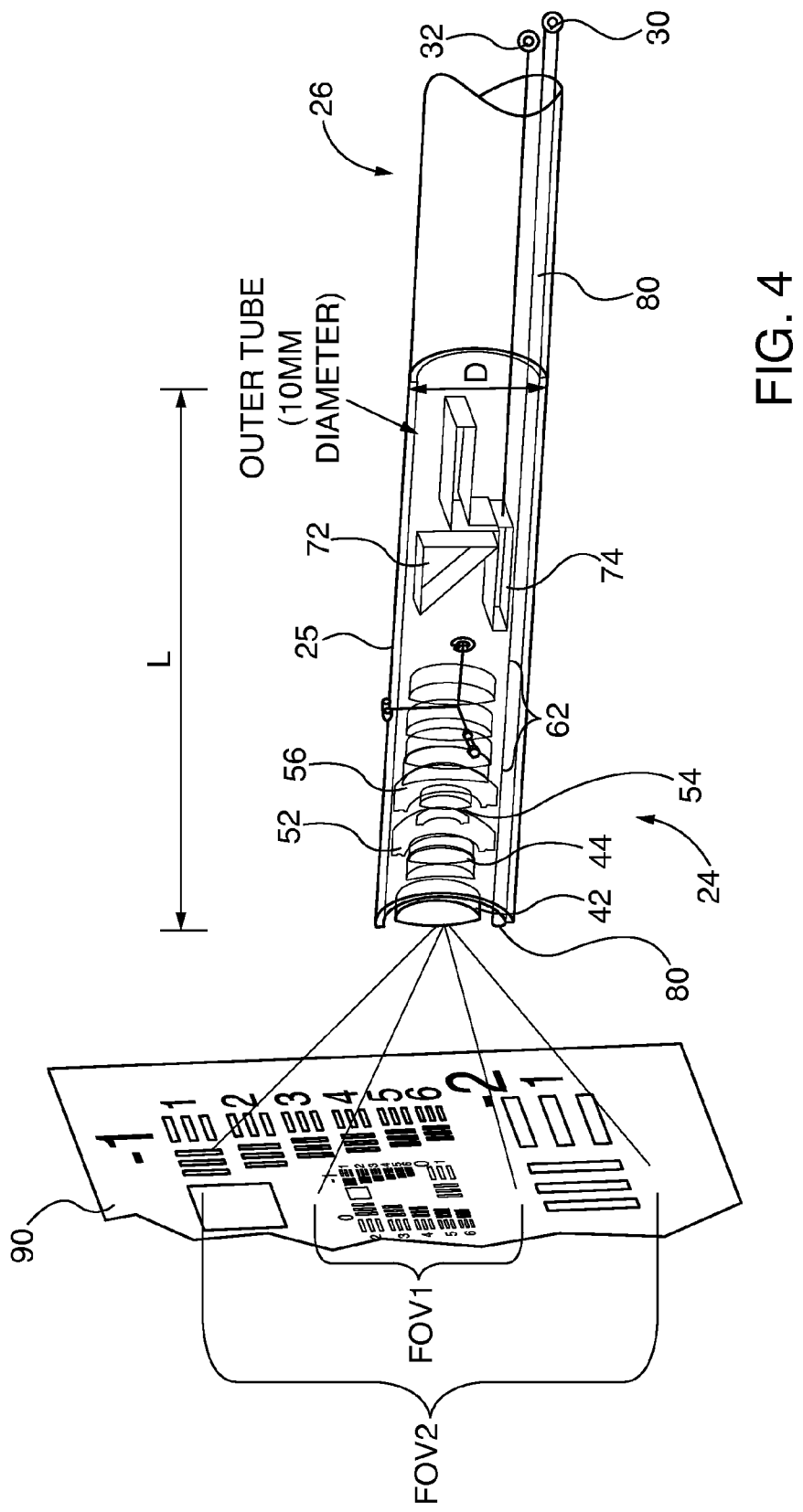
FIG. 4 is a perspective view of an exemplary embodiment of an optical head showing visual inspection of an object of interest.

FIGS. 3 and 4 show an exemplary embodiment of an optical lens train or system for creating a foveated image of an area to be inspected that is within the lens train overall field of view (FOV), comprising the first central image portion having the first angular field of view (FOV1) and magnification that is that is included within and subtended by the second outer concentric image portion having the second wider angle field of view (FOV2) and lower magnification. As can be seen readily by the light trace paths shown in FIG. 3, the optical head 24 lens train optical layout comprises along the same optical path: an objective lens or lens array 40 that provides the foveated image with aspheric, or spherical lenses or combination of both; a magnification/focusing range lens array 50; and a chromatic and aberration correction lens array 60. Light rays exiting the correction lens array 60 are directed to the image sensing system 70 that converts the transmitted optical image to a series of electrical signals for subsequent image processing and display by the control/display system 28.

In some embodiments the objective lens system 40 comprises a front element monolithic aspheric objective lens 42 and image focusing spherical lens 44. The front element 42 aspherical surface is designed to modify the distortion and provide the magnified area (FOV1) at the image center. Selection of the foveated image first central image portion (FOV1) or the entire subtending wider image portion (FOV2) is provided by a first liquid lens 52, which captures and transmits the full foveated image in response to an actuation voltage $V_0$ that is sent by the controller 32. In some embodiments the first liquid lens 52 can be switched to capture and transmit only the central first image portion FOV1 in response to an actuation voltage $V_1$ that is sent by the controller 32. The controller 32 synchronizes the first liquid lens 52 switching actuation frequency with the image sensing system 70 sampling rate, so that image capture is coordinated with the desired image field of view, FOV1 or FOV2. It is noted that in some embodiments the first liquid lens 52 is eliminated, in which case only the raw composite foveated image is transmitted by the objective lens system 40. Addition of the first liquid lens 52 allows selective downstream transmission of either the first (FOV1) or second (FOV2) image portions by altering the transmitted light rays effective focal length where they are redirected to strike the fixed position image sensing system 70.

In other embodiments that do not include a foveated objective lens system 40, simple separate wide angle and magnified images are provided that are desirably shown simultaneously on a dual display. In such systems, the lens system 40 does not include foveated lenses, but rather conventional image lenses. Magnification adjustment is provided by a magnification first liquid lens 52 that functions as a switch to capture and transmit only a magnified first image portion FOV1 or only the wider angle second image portion FOV2 in response to an actuation voltage $V_1$ or $V_2$ that is sent by the controller 32. The controller 32 synchronizes the first liquid lens 52 switching actuation frequency with the image sensing system 70 sampling rate, so that image capture is coordinated with the desired image field of view/magnification.

In some embodiments, such as those of FIGS. 3 and 4 a downstream second liquid lens 56 is used selectively to enhance focus of the image transmitted from the first liquid lens 52. Focus enhancement adjustment by the second liquid lens 56 is performed manually or automatically by causing the control system/display 28 controller 32 to alter energizing voltage $\Delta V_3$ supplied to the focusing liquid lens, synchronized as necessary with the first liquid lens 52 actuation voltage and the imaging system 70 image sampling rate. In either foveated or non-foveated image inspection systems, an optical aperture 54 can, but is not required, to be placed between the first and second liquid lenses 52, 56 in order to reduce optical aberrations. It is noted that either of the liquid lenses 52, 56 alone or in combination can be incorporated into the optical head 24, depending upon the desired functionality of the inspection system. If an inspection application only requires a composite foveated image the first liquid lens 52 can be eliminated, as there is no need to switch between the wide field of view and the central image portions of the composite foveated image. Alternatively if an inspection application does not require fine focusing adjustment of inspection images the second liquid lens can be eliminated. However, incorporation of both of the liquid lenses 52 and 56 provides more visual inspection flexibility (e.g., selective central image or wide field image viewing and focusing capability).

In the embodiments shown in FIGS. 3 and 4, a lens stack of chromatic/aberration corrective lenses 62 are interposed between the magnification/focusing lenses 50 and the image sensing system 70, which collectively correct spatial and spectral distortion before reaching the electronic image sensor 74. While four corrective lenses are shown in the lens stack 62 in other inspection applications no corrective lenses may be needed and in other applications one or more lenses may be needed.

The image sensing system 70 includes a known electronic sensor 74 element array of detector pixels, such as a charge coupled device (CCD) that converts light photons striking each pixel to electrical signals that is sampled by the controller 32 at a desired sampling rate for subsequent image processing by the control/display system 28. As previously mentioned the electronic sensor 74 sampling rate is synchronized with the activation frequency of either or both of the first or second liquid lenses 52, 56. The prism 72 redirects light rays exiting the correction lens array 60 radially toward the sensor 74. In this way a larger sensor array surface area may be packaged within the optical head 24 envelope than if the sensor had to be positioned axially downstream of the correction lens array 60 in alignment with housing radius. Thus the inspection system resolution is also enhanced by increasing the number of available sensor elements in the electronic image sensor array 74. A sensor readout board (not shown) is typically interposed between the sensor 74 output and the controller 32.

The borescope optical head 24 component and delivery system packaging are shown in greater detail in FIG. 4. All of the optical lenses 42, 44, 52, 56, 62 the optical prism 72 and the electronic image sensor 74 are all optically aligned along a common, shared optical path and are in fixed positions relative to each other within the optical head 24. By elimination of mechanical focusing or image magnification relative movement between optical components the optical head outer housing tube 25 axial length L and diameter D are reduced so that the borescope can be inserted within turbine engine inspection ports as small as 12 mm diameter. In exemplary embodiments the optical head 24 maximum diameter D is 11 mm and axial length L does not exceed 40 mm. It is possible to construct an optical head having an axial length not exceeding 30 mm. The optical head 24 also optionally includes a fiber optic light pipe 80 that is optically coupled to an illumination source within the external lighting system 30. Additionally, rigid position optical lens elements and detector elements utilized in embodiments herein have less risk of either thermal or mechanical distortion/damage than components that move relative to each other.

Figure 5:
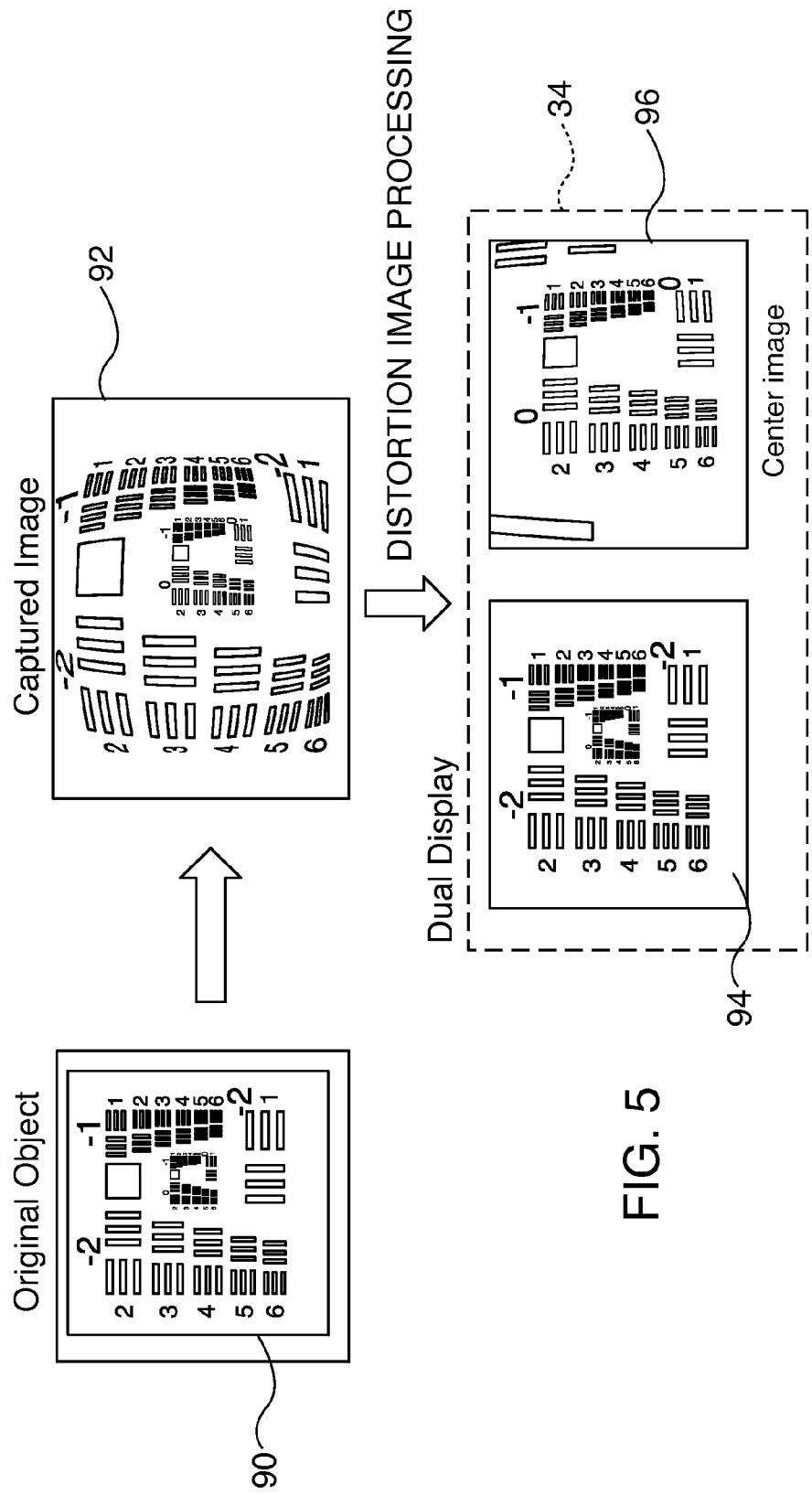
FIG. 5 is an image processing flow chart comparing an original object of interest, a foveated image captured by an exemplary embodiment of a turbine engine internal visual inspection system of the invention and simultaneous dual display of the foveated image magnified first image portion and the wider FOV second image portion.

In FIG. 4, a resolution test chart is the object of interest 90 being inspected by the borescope 22 and the turbine visual inspection system 20, with the first central part of the foveated image (FOV1) being enlarged and magnified more than the relatively wider field of view outer concentric portion FOV2. FIG. 5 shows exemplary image processing of the originally inspected object 90 to the fully captured foveated image 92, prior to any post image gathering processing to remove distortions, enhance or alter images gathered by the electronic image sensor, using known image processing methods. Alternatively the liquid lens 52 can be actuated by the controller to transmit only the central portion image 96 (FOV1) or only the concentric outer portion image 94 (FOV2). It is noted that the entire field of view of the object 90 appears in the wide angle image 94 though in smaller magnification than the magnified center image 96. Unlike some known "nested" optical systems that display "donut" images with missing centers, the present invention wide angle image 94 is not missing any of the central portions of the object of interest 90.

In many inspection applications it is desirable to have both the magnified image 96 and the wide angle image 94 simultaneously available for joint inspection on a common viewing display 34, as shown in FIG. 5, whether a foveated objective lens system 40 or a non-foveated objective lens system is employed within the inspection system. In this way inspection personnel can readily associate the magnified image 96 inspection details with navigational physical location within the inspected object that is afforded by the wide angle image outer 94. In exemplary embodiments, simultaneous dual central/wide angle image displays can be viewed on the inspection display screen 34 by causing the controller 32 to sequentially alternate two of the voltage pairs $V_0/V_1$ or $V_1/V_2$ that is applied to the first liquid lens 52, so that for example the last most recently generated central/wide angle image pairs are shown on the display screen. In the dual display mode the controller 32 can also automatically alter the voltage $V_3$ applied to the focusing second liquid lens 56 so that the displayed images are sharply in focus. When simultaneous dual view image display is desired, the controller 32 synchronizes the liquid lenses 52, 56 actuation frequencies with the electronic image sensor array 74 sampling rate. A suggested minimum synchronization frequency is 10 Hz, so that an inspector viewing the dual images does not perceive excessive display image fluctuation.

An internal visual inspection of a turbine engine is performed as follows, referring to FIGS. 1 and 2. First, the borescope 22 is inserted into the turbine engine 10 through engine internal passages, such as an inspection port, by advancing the flexible delivery mechanism conduit 26 to an internal area of interest for example visual inspection of turbine vanes 12 and turbine blades 14. Foveated images of the blades 14 are captured by the optical head 24 and forwarded to the control/display system 28 where they can be recorded on the data storage device 36 and/or transmitted to remote sites via data bus 38. The entire foveated image 92 and/or its magnified central first portion 96 (FOV1) and/or its outer wider field of view second portion 94 (FOV2) can be selectively displayed on the HMI/display 34, depending upon the actuation voltage that is applied to the liquid lens 52 by the controller 32. In some embodiments the first and second image portions 96, 94 are displayed simultaneously on a common video display viewing screen image, as shown in FIG. 5. As noted previously, the viewing screen can be incorporated into a fixed work station, a portable tablet computing device or a wearable device, including eyeglasses. Also as noted previously, using known image processing methods the control/display system 28 optionally can perform post image gathering processing to remove distortions, enhance or alter any of the images gathered by the electronic image sensor, such as shown in the wide angle image 94.

It is to be understood that, because some of the constituent system components and methods for performing turbine internal inspection described herein are preferably implemented in software instruction sets executed by the controller 32 (e.g., a tablet computer), the actual connections between the system components (or the inspection process steps) may differ depending upon the manner in which the exemplary embodiments are programmed in the software instruction sets. Specifically, any of the computer platforms or devices may be interconnected using any existing or later-discovered networking technology and may also all be connected through a lager network system, such as a corporate network, metropolitan network or a global network, such as the Internet.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical or electrical connections or couplings.

What is claimed is:

1. A method for internal visual inspection of a turbine engine, comprising:
    providing an inspection system, including a borescope having:
        an objective lens system with a train of fixed-position objective lenses that are aligned on a single optical path, for refracting an incident image into a single, refracted, foveated output image including a first central output image portion having a first angular field of view and magnification that is included within and subtended by a second output image portion having a second wider angle field of view and lower magnification, and
        a single electronic, sensor element array of detector pixels downstream of and optically aligned along the single optical path of the objective lenses, for capturing all of said single, refracted, foveated output image there upon in a single sample;
    inserting the borescope from an exterior of a turbine engine through engine internal passages to an internal area of interest;
    capturing, in a single sample image all of said refracted, foveated output image of the internal area of interest within the engine with the inspection system on said single electronic sensor element array along said single optical path; and
    displaying all of said refracted, foveated output image that was captured in the single sample by the inspection system as a single display image on a video display.

2. The method of claim 1, the provided borescope further comprising an image switching liquid lens for selectively transmitting the first or second image portions of said refracted, foveated output image that were received from the objective lens system, with all of the respective lenses in the borescope coupled in fixed axial positions along a shared, single optical path with said electronic sensor element array within an optical head.

3. The method of claim 1, the provided borescope further comprising a focusing liquid lens for selectively enhancing focus of the refracted, foveated output images received from the objective lens system, with all of the respective lenses coupled in fixed axial positions along a shared, single optical path with said electronic sensor element array within an optical head.

4. A method for internal visual inspection of an assembled turbine engine from an exterior thereof, comprising:
    providing an inspection system including:
        a borescope having:
            an elongated delivery mechanism having a distal end for insertion from an exterior of a turbine engine through internal passages within the engine to areas of interest;
            an optical head coupled to the delivery mechanism distal end, sharing on a single, common optical path:
                an objective lens system with a train of fixed-position objective lenses, for refracting an incident image into a single, refracted, foveated output image including a first central image portion having a first angular field of view and magnification that is that is included within and subtended by a second outer image portion having a second wider angle field of view and lower magnification,
                a first liquid lens, for selectively transmitting said refracted, foveated output image first or second portions that were received from the objective lens system,
                a second liquid lens for selectively enhancing focus of the refracted, foveated output image first or second portions received from the first liquid lens,
                with the respective objective, first liquid, and second liquid lenses coupled in fixed axial positions along the shared single optical path within the optical head,
                a single electronic image sensor element array of detector pixels optically coupled to the second liquid lens, for common sample, capture and transmission of all portions of all refracted, foveated images received from the second liquid lens,
a liquid lens control system coupled to the first liquid lens for selectively causing the first liquid lens to transmit first or second portions of said refracted, foveated images received from the objective lens, and coupled to the second liquid lens for selectively or automatically causing the second liquid lens to enhance focus of the images transmitted by the first liquid lens, and
an imaging system coupled to said electronic sensor element array, for selectively generating said foveated image first or second portions, viewable outside an exterior of the inspected turbine engine on a common video display;
inserting the inspection optical head from an exterior of a turbine engine to an internal area of interest within by routing the delivery mechanism through engine internal passages;
capturing images of the internal area of interest within the engine with the imaging system; and
selectively displaying the captured images outside the turbine engine exterior by selectively causing the first liquid lens to transmit said selected image with the liquid lens control system to said electronic image sensor element array and the on the common video display of the imaging system.

5. The method of claim 4, the liquid lens control system automatically controlling the first and second liquid lenses to focus images transmitted by the first liquid lens.

6. The method of claim 5, the provided borescope optical head further comprising at least one corrective lens oriented in the common optical path between the second liquid lens and said electronic image sensor element array for image chromatic and/or aberration correction.

7. The method of claim 4, the provided borescope optical head further comprising at least one corrective lens oriented in the common optical path between the second liquid lens and said electronic image sensor element array for image chromatic and/or aberration correction.

8. The method of claim 4, the objective lens system further comprising a monolithic aspheric objective lens.

9. A turbine engine internal visual inspection system, comprising:
a borescope having:
an elongated delivery mechanism having a distal end for insertion from an exterior of a turbine engine through internal passages within the engine to areas of interest;
an optical head coupled to the delivery mechanism distal end, sharing on a single, common optical path:
an objective lens system with a train of fixed-position objective lenses, for refracting an incident image into a single, refracted, foveated output image including a first central image portion having a first angular field of view and magnification that is that is included within and subtended by a second outer image portion having a second wider angle field of view and lower magnification,
a first liquid lens, for selectively transmitting said refracted, foveated output image first or second image portions that were received from the objective lens system,
a second liquid lens for selectively enhancing focus of the refracted, foveated output image first or second portions received from the first liquid lens,
with the respective objective, first liquid, and second liquid lenses coupled in fixed axial positions along the shared, single, common optical path within the optical head,
a single electronic image sensor element array of detector pixels optically coupled to the second liquid lens, for common sample, capture and transmission of all portions of all refracted, foveated images received from the second liquid lens,
a liquid lens control system coupled to the first liquid lens for selectively causing the first liquid lens to transmit first or second portions of said refracted, foveated images received from the objective lens, and coupled to the second liquid lens for selectively or automatically causing the second liquid lens to enhance focus of the image portions transmitted by the first liquid lens, and
an imaging system coupled to said electronic image sensor element array, for selectively generating said foveated image first or second portions, viewable outside an exterior of the inspected turbine engine on a common video display.

10. The system of claim 9, the objective lens system further comprising a monolithic aspheric objective lens.

11. The system of claim 9, the borescope optical head further comprising at least one corrective lens oriented in the common optical path between the second liquid lens and said electronic image sensor element array, for image chromatic and/or aberration correction.

12. The system of claim 9, the liquid lens control system automatically controlling the first and second liquid lenses to focus images transmitted by the first liquid lens.

13. The system of claim 9, the borescope optical head further comprising an optical prism oriented in the common optical path between the second liquid lens and said electronic image sensor element array.

14. The system of claim 9, further comprising a display coupled to the imaging system, for selectively displaying said foveated image first or second portions.

15. The system of claim 9, the imaging system compensating for image distortion in images captured by said electronic image sensor element array.

16. The system of claim 9, further comprising an image recording system coupled to the imaging system, for recording images generated by the imaging system.

17. The system of claim 9, further comprising an illumination source coupled to the optical head.

18. The system of claim 9, the elongated delivery mechanism comprising a flexible conduit.

19. The system of claim 18, the optical head and delivery mechanism having a maximum outer diameter of less than 11 millimeters.

20. The system of claim 9, the optical head and delivery mechanism having a maximum outer diameter of less than 11 millimeters.

* * * * *